United States Patent
Hochgräber et al.

Patent Number: 5,384,800
Date of Patent: Jan. 24, 1995

[54] FEEDBACK CONTROL FOR A HIGH-FREQUENCY GENERATOR HAVING A PULSE-REPETITION FREQUENCY MODE, PARTICULARLY FOR EXCITING A LASER

[75] Inventors: Hermann Hochgräber, Seefeld; Bernhard Hemmer, Schesslitz, both of Germany

[73] Assignee: Siemens Aktiengesellschaft, Munich, Germany

[21] Appl. No.: 69,635

[22] Filed: Jun. 1, 1993

[30] Foreign Application Priority Data
Jun. 1, 1992 [DE] Germany .................. 4218017

[51] Int. Cl.⁶ ................................ H01S 3/00
[52] U.S. Cl. ........................ 372/38; 372/26; 372/28; 372/32; 372/29; 372/25; 372/30
[58] Field of Search .......... 372/18, 25, 26, 28, 372/29, 30, 31, 32, 38, 43, 108, 109

[56] References Cited

U.S. PATENT DOCUMENTS

| | | | |
|---|---|---|---|
| 4,263,088 | 4/1981 | Gorin | 156/626 |
| 4,707,838 | 11/1987 | Reule et al. | 372/38 |
| 4,733,398 | 3/1988 | Shibagaki et al. | 372/38 X |
| 4,856,010 | 8/1989 | Wissman et al. | 372/32 |
| 4,903,276 | 2/1990 | Ross | 372/82 |
| 4,965,805 | 10/1990 | Hayes | 372/32 |
| 5,005,177 | 4/1991 | Beckwith | 372/38 X |
| 5,127,015 | 6/1992 | Chikugawa et al. | 372/38 |
| 5,150,372 | 9/1992 | Nourrcier | 372/38 |
| 5,224,112 | 6/1993 | Uesaka | 372/38 |
| 5,317,578 | 5/1994 | Ogou | 372/38 X |
| 5,323,408 | 6/1994 | Hahn et al. | 372/29 |
| 5,335,107 | 8/1994 | Georges et al. | 372/38 X |
| 5,335,239 | 8/1994 | Herczeg et al. | 372/38 |

FOREIGN PATENT DOCUMENTS

| | | | |
|---|---|---|---|
| 0374444 | 3/1989 | European Pat. Off. | 372/38 X |
| 2414430 | 7/1980 | Germany | 372/38 X |
| 3048531 | 9/1981 | Germany | 372/38 X |
| 3433901 | 10/1987 | Germany | 372/38 X |
| 3722323 | 1/1989 | Germany | 372/38 X |
| 3940295 | 6/1991 | Germany | 372/38 X |

OTHER PUBLICATIONS

IEEE Journal of Quantum Electronics, vol. 25, No. 3, Mar. 1989, New York, U.S., pp. 245–248, G. N. Pearson et al. 'RF Excited Tunable Co. Laser With Opto Herzian Frequency Stabilization'.

Applied Optics, vol. 29, No. 9, Mar. 20, 1990, New York, U.S., pp. 1246–1248, H. H. Klingenberg et al. 'L–Band Microwave Pumped XeCl Laser Without Pre-ionization'.

IEEE Journal of Quantum Electronics, vol. 28, No. 2, Feb. 1992 pp. 404–407; Robert T. Brown et al.: Large-Volume Pulsed–RF Excited Waveguide $CO_2$ Lasers.

Appl. Physics Lett. 40(1), 1 Jan. 1982, American Institute of Physics; pp. 13–15; S. Lovold and G. Wang: Ten-atmospheres high repetition rate rf-excited $CO_2$ waveguide laser.

*Primary Examiner*—Brian Healy
*Attorney, Agent, or Firm*—Kenyon & Kenyon

[57] ABSTRACT

The present invention relates to the feedback control of the power output from a high-frequency generator for supplying a pulsed laser. During a pulsing operation, the power output is regulated by means of a controllable grid-leak resistor in the grid circuit of the valve tube of the high-frequency generator. An equivalent system is preselected for the feedback control in the pulse intervals and, consequently, transient reactions are minimized.

18 Claims, 3 Drawing Sheets

FEEDBACK CONTROL FOR A HIGH-FREQUENCY GENERATOR HAVING A PULSE-REPETITION FREQUENCY MODE, PARTICULARLY FOR EXCITING A LASER

BACKGROUND OF THE INVENTION

The present invention relates to a feedback control device for a high-frequency generator having a pulse-repetition frequency mode, particularly for a high-frequency generator employed to excite a laser.

When $CO_2$ lasers are operated with high-frequency excitation in a pulsed operation mode, the impedance of the laser is not constant. Therefore, to ensure that the laser is supplied with constant energy during high-frequency pulsing, the high-frequency generator must be provided with a power control system. Such a power control system must control the power output such that, for example, the difference between the energy of the wave advancing toward the laser and the wave reflected by the laser (when no discharge occurs) is constant.

Therefore, there is a need for a high-speed and highly precise feedback control for the power output of a high-frequency generator operated in a pulsed mode.

SUMMARY OF THE INVENTION

The present invention meets the aforementioned need by providing a feedback power control arrangement including:

a) an output regulator provided with a signal proportional to the actual value of the power output of the high-frequency generator during the pulse duration as a first input and a signal proportional to the required setpoint value as a second input, and which outputs a signal for triggering a final control element of the high-frequency generator;

b) a storage device provided with the output signal of the output regulator as an input signal and in which the active output signal from the output regulator can be stored at the end of the pulse duration; and c) an equivalent simulation system being provided with the differential between the signal stored in the storage device (as a setpoint value model equivalent) and the output signal of the output regulator (as an actual value model equivalent) during the pulse interval, and having an output signal able to be injected, during the pulse intervals, as an actual value into the first input of the output regulator.

The feedback control system of the present invention advantageously permits analog control in a pulsed mode since the controller is taken "off-line" during the pulse intervals and is provided with a model equivalent signal. Thus, the power output of the high-frequency generator is controlled independent of the frequency and independent of the duty factor of the applied external pulse-repetition signal.

In comparison to feedback control systems which disable the setpoint when in a pulsing mode, the control of the present invention advantageously minimizes the transient reactions at the beginning of the next pulse.

DETAILED DESCRIPTION

Figure 1:
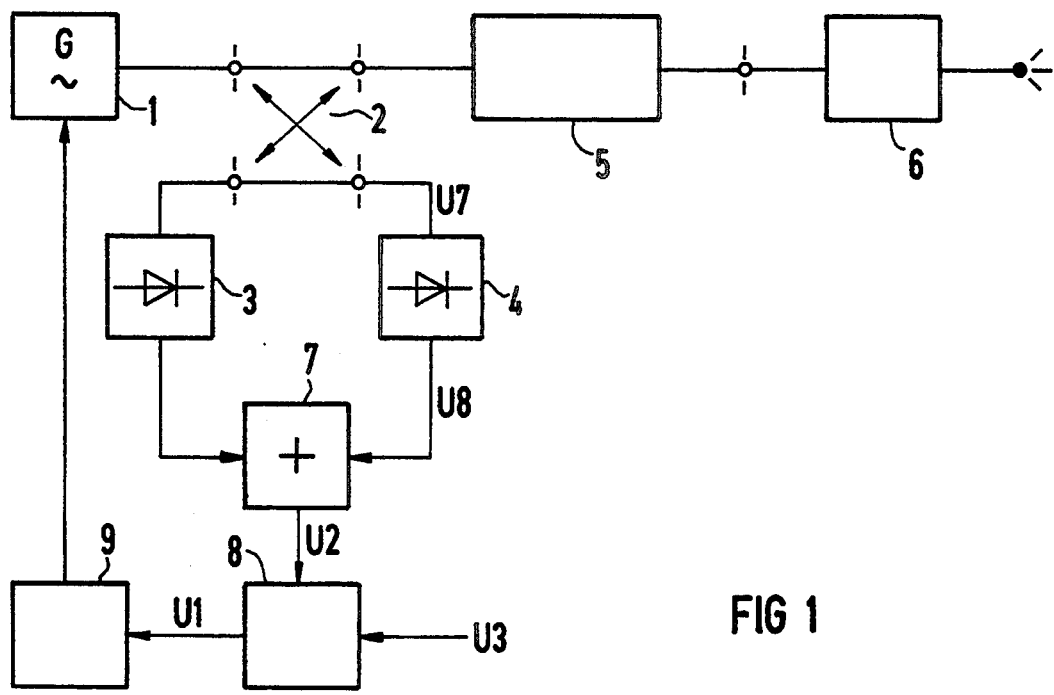
FIG. 1 depicts the principal circuit schematic of the arrangement in which the feedback control system according to the present invention is used.

The present invention ensures that a laser 6 receives a constant high-frequency power output from the high-frequency generator 1 during high-frequency pulsing. To meet this requirement, the power output of the generator must be controlled so as to allow the difference between the energy of the wave advancing toward the laser 6 and the wave reflected by the laser (when no discharge occurs) to be constant.

The two active-power meters 3 and 4 measure the energy of the forward (i.e., advancing) wave and of the reflected wave, respectively, on the supply line between the high-frequency generator 1 and the laser 6, between which is a matching network 5. The meters 3 and 4 receive voltages measured from a directional coupler 2. The output voltages from the two active-power meters 3 and 4 are proportional to the power output and are supplied to a differential element 7. The power supplied to the laser 6 can be determined from a differential voltage signal U2 output from the differential element 7. The voltage signal U2 and a setpoint value U3, are provided as inputs to a control arrangement 8 which generates a control voltage U1 for a final control element 9. The final control element 9 provides a control signal to the high-frequency generator 1 to control the power output of the high-frequency generator 1 such that the measured power differential (derived from U2) and, thus, the energy supplied to the laser 6, is kept constant. Alternatively, rather than using the wave differential U2, another value that is representative of the power output can be used, for example, the forward wave itself or the laser power.

Figure 2:
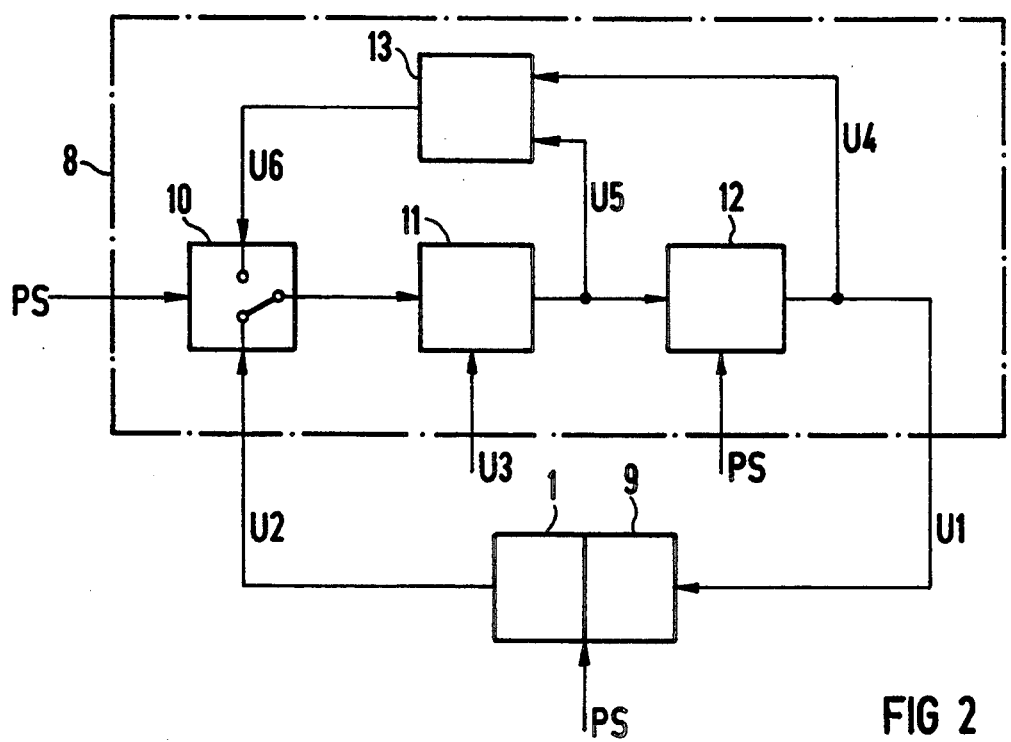
FIG. 2 depicts the principle circuit schematic of the control system of the present invention.

The control arrangement 8 is depicted in greater detail in FIG. 2. As is shown, the power output of the high-frequency generator 1 together with the load (resulting from the impedance of the laser) is acquired at the output of the system to be controlled (consisting of the final control element 9 and the high-frequency generator 1) and is supplied to the control arrangement 8. An actual power value U2 is provided as a first input of an output regulator 11 via an analog switch 10 (during the pulse duration). The desired setpoint power value U3 is provided as a second input to the output regulator 11. The output regulator may be a PI (Proportional Integral) control element for example. Based on the differential between the setpoint power value U3 and actual power value U2, the output regulator 11 generates a trigger signal U1 for the final control element 9. Using the trigger signal U1, control element 9 generates an output which is provided to the high frequency generator 1 and which assures that the power output from the high-frequency generator 1 is maintained at the desired value for the pulse duration.

The high-frequency generator 1 can be, for example, a self-oscillating valve-tube, or vacuum tube, oscillator having a triode, whose power output is able to be automatically controlled via a grid controlling element. Its operating frequency can be, for example, 80 MHz, while the pulse-repetition frequency can be, for example, 30 kHz.

In the control arrangement 8, the output regulator 11 (for example a PI control element) used for the feedback control is advantageously provided with model equivalent inputs during the pulse intervals of the high-frequency generator 1. For this purpose, a sample-and-hold element 12 is allocated to the output regulator 11 and serves as a storage device for storing the output signal from the output regulator 11 at the end of the pulse duration. The sample-and-hold element 12 is activated by the pulse-repetition signal PS.

At the end of the pulse duration, the high-speed analog switch 10 (controlled by pulse repetition signal PS) connects the output of a model equivalent system 13 to the first input of the output regulator 11. The sample-and-hold element 12 provides a model equivalent set-point value signal U4 to the second input of the equivalent simulation system 13. The setpoint value U4 corresponds to the controller output signal at the end of the pulse duration of the controlled system 1, 9. The equivalent system 13 compares the model equivalent set-point value U4 to the actual value U5, i.e., to the active output signal from the output regulator 11. The resulting signal U6 is provided as an output of the equivalent system 13, and brings the output regulator 11 to, or rather retains the output regulator 11 in, the state it had been in at the end of the pulse duration.

In comparison to feedback control systems which disable the setpoint when the high frequency generator is in a pulsing mode, e.g., by omitting the setpoint value U3, the feedback control system of the present invention advantageously minimizes transient reactions at the beginning of the next pulse.

Figure 3:
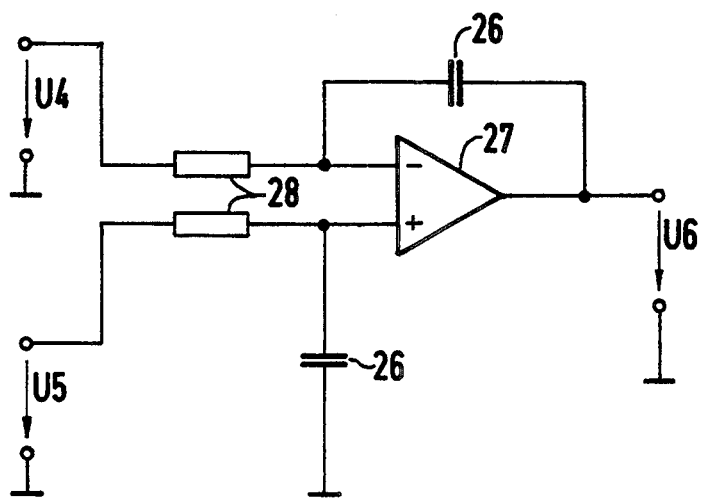
FIG. 3 depicts the circuit arrangement of the equivalent system used by the control system of the present invention.

As shown in FIG. 3, the equivalent simulation system 13 may comprise a differential integrator, comprising, for example, an operational amplifier 27 wired to capacitors 26 and to input resistors 28.

The control arrangement clarified above is extremely well suited for use with systems in which the grid controlling element for the valve tube, or vacuum tube, oscillator of the high-frequency generator comprises two parts, those two parts being a high-speed switch for disconnecting the high-frequency power and an analog actuator for the power output from the high-frequency generator 1.

Figure 4:
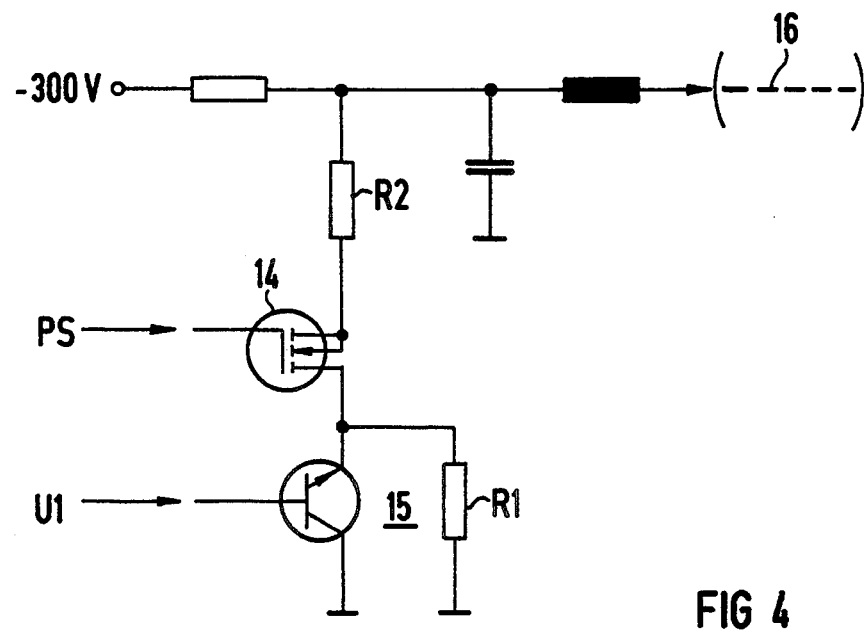
FIG. 4 depicts the structure of the final control element of the present invention.

As shown in FIG. 4, the valve tube, or vacuum tube, (not shown) includes a grid controlling element comprising two parts coupled in series. The first part 14 represents the high-speed switch, which is capable of being digitally triggered and is used to switch the high-frequency generator 1 on and off. The second part 15 acts as a grid-leak resistor 15, which can be controlled by a voltage signal and which allows the power output from the high-frequency generator 1 to be precisely regulated.

The high speed digital switch 14 can be a MOS transistor for example. By using an exciter module (i.e., a driver block), this transistor can be shifted from an extremely high-impedance to an extremely low-impedance state within a few nanoseconds. If the transistor is at high-impedance, then an externally supplied cut-off bias voltage is applied to the grid 16 of the valve tube (triode) (not shown), so that the anodic current becomes zero and the oscillator oscillation breaks away. If the MOS transistor of the switch 14 is conductive (i.e., is at low-impedance), the grid-leak resistor 15, comprising a transistor and of the resistors R1 and R2, becomes active. The valve-tube oscillator then begins to oscillate. The amplitude and thus the power output of the high-frequency generator can be adjusted by means of the signal U1. The two transistors can also be combined. The grid controlling element also permits power to be controlled during the continuous operation of the laser, or rather of the high-frequency generator.

Figure 5:
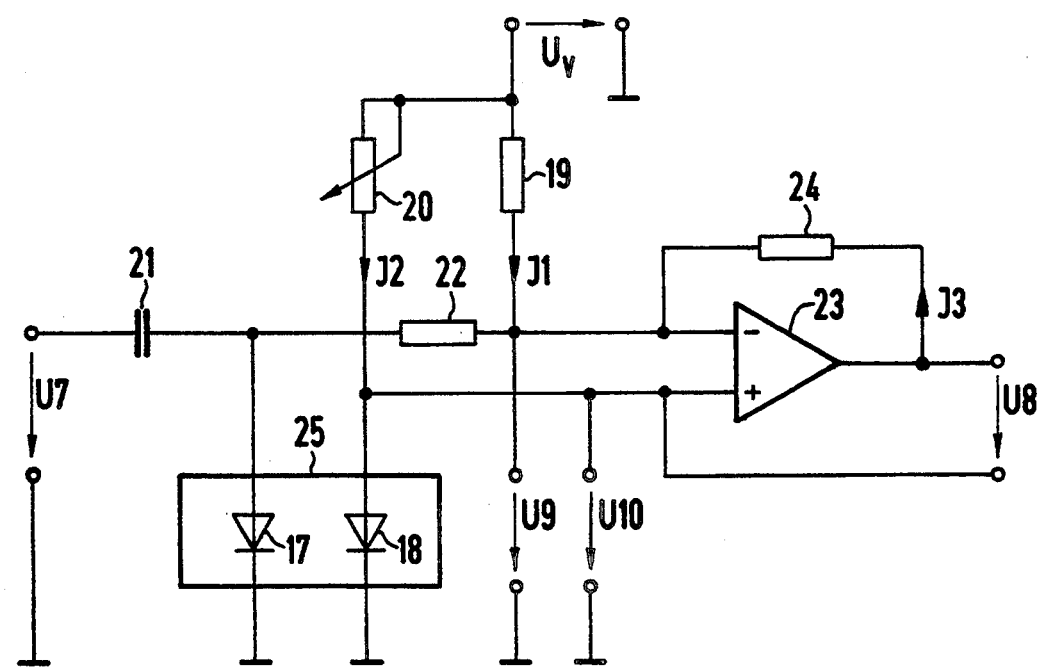
FIG. 5 depicts a principal circuit arrangement for output power measurement.

The circuit arrangement of FIG. 5 illustrates the active-power meters, 3 and 4, depicted in FIG. 1. The active-power meters convert the rectified voltage U7 (or rectified current), which is proportional to the power output and which is created by the effect of high frequency, into a voltage U8 which is proportional to power output.

A twin diode is used to map the rectified current. The two diodes 17 and 18 are accommodated in the same housing 25 so that they are closely coupled in terms of temperature. Diode 17 is employed as a detector diode, while diode 18 is used as a reference diode. Diode 17 receives the high-frequency voltage U7 via a coupling capacitor 21. It receives its biasing current J1 from the voltage $U_v$ via resistor 19 and inductor 22. The inductor 22 prevents a high-frequency drain-off. Diode 18 receives its biasing current J2 from the voltage $U_v$ via resistor 20. The resistor 20 is adjusted so as to allow the output voltage U8 (i.e., the voltage across the output of the operational amplifier 23) to become zero, without any high-frequency modulation of the diode 17. As a result, the feedback current J3 through the resistor 24 also becomes zero. The operational amplifier 23, which is coupled with negative feedback via the resistor 24, induces the biasing voltage of the two diodes 17 and 18, i.e., the voltages U9 and U10, to always remain the same, even when the diode 17 is modulated with a high-frequency alternating signal. This type of circuit has three special advantages:

1) it prevents an operating-point shift, typical of such detectors, on the diode 17 and, thus, prevents a change in responsivity when the diode 17 is modulated by a high-frequency alternating signal;
2) the power-proportional rectified current is mapped exactly in the current of the negative-feedback resistor. The voltage U8, i.e., the voltage across the resistor 24, is directly proportional to the power of the high-frequency signal which is injected via the capacitor 21; and
3) the high-frequency-side input impedance of the arrangement remains independent of modulation.

The above described high-frequency control arrangement can also be used to supply other power consuming devices, such as plasma producers or heating units.

What is claimed is:

1. A feedback control system for controlling a continuous high-frequency generator having a pulse-repetition frequency mode, said feedback control system comprising:

a) an output regulator, being provided with a signal representative of an actual value of power output from the high-frequency generator as an input during a pulse duration, and being provided with a signal proportional to a required setpoint value as an input during a pulse interval, and providing an output signal which controls the high-frequency generator;

b) a simulation system for simulating the high-frequency generator, said simulation system providing an output signal for input into the output regulator as an actual value during pulse intervals; and c) a storage device, which accepts as its input, the output signal of the output regulator and in which the output signal from the output regulator is stored at the end of the pulse duration wherein, said simulation system is modulated during the pulse interval between the signal stored in said storage device and the output-regulator output signal.

2. The feedback control system according to claim 1 wherein said simulation system is a differential integrator.

3. The feedback control system according to claim 1, in which a high-speed analog switch provides either the differential signal of the system to be controlled or the output of the simulation system as the input of the output regulator.

4. The feedback control system of claim 1 wherein the high-frequency generator includes a valve tube, said valve tube being controlled with a grid controlling element comprising a series connection of a digitally triggered switch, and a grid-leak resistor, controllable by the output signal of the output regulator.

5. The feedback control system according to claim 1, in which biasing-voltage-compensated twin diodes are provided for measuring power output.

6. The feedback control system according to claim 4, in which the controllable grid-leak resistor comprises a parallel connection of a controllable transistor and a resistor.

7. The feedback control system according to claim 4, in which the digitally triggerable switch and the controllable transistor are electrically combined.

8. A control device for controlling a high frequency generator operating in a pulse mode comprising:
a) means for measuring an actual power value output from the high frequency generator;
b) means for switching having
   i) a first input coupled to said means for measuring,
   ii) a second input, and
   ii) an output, and being controlled by a pulse repetition signal;
c) an output regulator having
   i) a first input coupled to said output of said means for switching,
   ii) a second input provided with a set point value, and
   iii) an output coupled with said high frequency generator, said output of said output regulator providing a control signal;
d) means for sampling said control signal output by said output regulator, said means for sampling being enabled by said pulse repetition signal and having an output; and
e) means for providing a signal simulating the actual power value output from the high frequency generator, said means for providing having
   i) a first input coupled with said output of said output regulator,
   ii) a second input coupled with said output of said means for sampling, and
   iii) an output coupled with said second input of said means for switching.

9. The control device of claim 8 wherein a pulse train generated by the high frequency generator in the pulse mode comprises a plurality of alternating pulse durations and pulse intervals, and wherein said pulse repetition signal corresponds to said pulse train.

10. The control device of claim 9 wherein said means for providing comprises a differential integrator.

11. The control device of claim 10 wherein said differential integrator comprises:
a) an operational amplifier having an inverting input, a non-inverting input, and an output, said output of said operational amplifier being coupled with said output of said means for providing;
b) a first resistor coupled between said first input of said means for providing and said non-inverting input of said operational amplifier;
c) a second resistor coupled between said second input of said means for providing and said inverting input of said operational amplifier;
d) a first capacitor having a first lead coupled to said non-inverting input of said amplifier and having a second lead coupled to ground; and
e) a second capacitor disposed between said output of said operational amplifier and said inverting input of said operational amplifier.

12. The control device of claim 8 wherein said output regulator is a proportional integral control device.

13. The control device of claim 9 wherein said output regulator is a proportional integral control device.

14. A feedback control system for controlling a power output of a high-frequency generator working in pulse-repetition frequency mode in dependence upon a pulse-repetition frequency signal having pulse durations and pulse intervals, said feedback control system comprising:
a) a measuring device, said measuring device
   i) measuring the power output of the high-frequency generator, and
   ii having an output;
b) a changeover device, said changeover device
   i) being controllable based on the pulse-repetition frequency signal,
   ii) having a first input coupled with the output of the measuring device, a second input, and an output,
   iii) connecting its first input to its output during the pulse durations, and
   iv) connecting its second input to its output during the pulse intervals;
c) an output regulator, said output regulator
   i) having a first input coupled with the output of the changeover device,
   ii) having a second input which receives a setpoint value for the power output of the high-frequency generator, and
   iii) having an output;
d) a storage element, said storage element
   i) having an input coupled with the output of the output regulator,
   ii) being controlled by the pulse-repetition frequency signal and storing the output signal from the output regulator at the end of the pulse durations, and
   iii) having an output; and
e) a feedback device, said feedback device
   i) having a first input coupled with the output of the output regulator,
   ii) having a second input coupled with the output of the storage element, and
   iii) having an output coupled with the second input of the changeover device,
wherein the feedback device controls the output regulator during the pulse intervals so as to allow its output signal to assume the value of the output signal stored in the storage element at the end of the pulse duration.

15. The feedback control system of claim 14 wherein said feedback device is a differential integrator.

16. The feedback control system of claim 14 wherein the measuring device is provided with biasing voltage compensated twin diodes.

17. The feedback control system of claim 14 wherein the high-frequency generator includes a valve tube, said valve tube being controlled with a grid controlling element comprising a series connection of a digitally triggered switch, and a grid-leak resistor, controllable by the output signal of the output regulator.

18. The feedback control system of claim 17 wherein the controllable grid-leak resistor comprises a parallel connection of a controllable transistor and a resistor.

* * * * *